(12) United States Patent
Swinkels et al.

(10) Patent No.: US 9,819,586 B2
(45) Date of Patent: Nov. 14, 2017

(54) NETWORK-BASED ETHERNET SWITCHING PACKET SWITCH, NETWORK, AND METHOD

(71) Applicant: Ciena Corporation, Hanover, MD (US)

(72) Inventors: Gerard Leo Swinkels, Ottawa (CA); Nigel Lawrence Bragg, Weston Colville (GB)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/055,735

(22) Filed: Feb. 29, 2016

(65) Prior Publication Data

US 2016/0191386 A1 Jun. 30, 2016

Related U.S. Application Data

(63) Continuation of application No. 14/180,103, filed on Feb. 13, 2014, now Pat. No. 9,313,121.

(60) Provisional application No. 61/840,790, filed on Jun. 28, 2013.

(51) Int. Cl.
| | |
|---|---|
| *H04L 12/28* | (2006.01) |
| *H04L 12/56* | (2006.01) |
| *H04L 12/741* | (2013.01) |
| *H04L 12/723* | (2013.01) |
| *H04L 12/931* | (2013.01) |
| *H04L 12/751* | (2013.01) |
| *H04L 29/08* | (2006.01) |
| *H04L 12/721* | (2013.01) |

(52) U.S. Cl.
CPC ............ *H04L 45/745* (2013.01); *H04L 45/02* (2013.01); *H04L 45/50* (2013.01); *H04L 49/351* (2013.01); *H04L 49/602* (2013.01); *H04L 69/326* (2013.01); *H04L 45/66* (2013.01)

(58) Field of Classification Search
CPC ...... H04L 45/745; H04L 45/02; H04L 69/326
See application file for complete search history.

(56) References Cited

U.S. PATENT DOCUMENTS

| 6,389,030 B1 | 5/2002 | Coden |
| 6,665,273 B1 | 12/2003 | Goguen et al. |
| 2002/0109879 A1 | 8/2002 | Wing So |
| 2002/0114036 A1* | 8/2002 | Ghani ................. H04J 14/02 398/49 |

(Continued)

*Primary Examiner* — Lonnie Sweet
(74) *Attorney, Agent, or Firm* — Clements Bernard Walker PLLC; Christopher L. Bernard; Lawrence A. Baratta, Jr.

(57) ABSTRACT

Embodiments of the disclosure are directed to implementing a router Media Access Control (MAC) Ethernet switch in a network. An Ethernet-over-Dense Wave Division Multiplexing (DWDM) packet switch system includes a transport switching element communicatively coupled to one or more routers in a client layer and communicatively coupled via a photonic switching layer with a plurality of transport switching elements forming a transport layer; wherein the transport switching element is configured to flood addresses, in the transport layer, associated with the one or more routers to disseminate learned end-point addresses of the one or more routers so that service-based addressing is resolved by the transport layer. The addresses from the client layer are flooded in the control plane which is a lower layer control plane relative to the client layer to allow the transport switching element and the plurality of transport switching elements to use of the addresses.

20 Claims, 6 Drawing Sheets

(56) References Cited

U.S. PATENT DOCUMENTS

| | | | |
|---|---|---|---|
| 2008/0310437 A1* | 12/2008 | Cheng | H04L 12/42 370/404 |
| 2011/0116366 A1* | 5/2011 | Smith | H04L 45/02 370/225 |
| 2012/0075988 A1* | 3/2012 | Lu | H04L 45/02 370/218 |
| 2012/0170467 A1* | 7/2012 | Bencheck | H04L 41/5025 370/252 |
| 2012/0189011 A1 | 7/2012 | Cui et al. | |
| 2013/0163982 A1* | 6/2013 | Tochio | H04J 14/0254 398/2 |
| 2014/0136682 A1 | 5/2014 | Lukas et al. | |

\* cited by examiner

| MPLS ROUTER | ROUTER INTERFACE MAC ADDRESS | NSAP ADDRESS | INTERFACE NUMBER |
|---|---|---|---|
| 10.1.1.1 | 00:08:5C:00:00:01 | 49.0001.1111.1111.1111.00 | NSAP INTERFACE NUMBER 1 |
| 10.1.1.2 | 00:0F:EA:91:04:07 | 49.0001.1234.AAAA.AAAA.00 | NSAP INTERFACE NUMBER 2 |
| 10.1.1.3 | BC:AE:C5:C3:16:93 | 49.0001.AAAA.BBBB.CCCC.00 | NSAP INTERFACE NUMBER 3 |
| 10.1.1.4 | BC:A2:33:91:00:16 | 49.0001.ABCD.ABCD.ABCD.00 | NSAP INTERFACE NUMBER 4 |

FIG. 4

NETWORK-BASED ETHERNET SWITCHING PACKET SWITCH, NETWORK, AND METHOD

CROSS-REFERENCE TO RELATED APPLICATION(S)

The present patent/application is a continuation of U.S. patent application Ser. No. 14/180,103, filed on Feb. 13, 2014, entitled "METHOD AND SYSTEM FOR TRAFFIC ENGINEERED MPLS ETHERNET SWITCH," which claims the benefit of U.S. Provisional Application No. 61/840,790, entitled "METHOD AND SYSTEM FOR TRAFFIC ENGINEERED MPLS ETHERNET SWITCH," filed Jun. 28, 2013, assigned to the assignee hereof, and each of which is expressly incorporated herein by reference in its entirety.

FIELD OF THE INVENTION

Embodiments of the disclosure are directed to an Ethernet-over-Dense Wave Division Multiplexing (DWDM) packet switch, network, and method as well as switching data packets with minimal packet modification.

DESCRIPTION OF THE RELATED ART

Typically, packet networks use the data plane and insert control packets to manage the data plane. In some instances, the ingress data packets may be modified. Likewise, the client and transport packet network can interact. Switching packets can involve a control protocol to control per packet path of each packet. Endpoint discovery and dissemination of addressing details can then occur via the control protocol.

Resilient Packet Ring (RPR) is a protocol standard designed for the optimized transport of data traffic over optical fiber ring networks. RPR works on a concept of dual counter-rotating rings called ringlets. These ringlets can be set up by creating RPR stations at nodes where traffic is supposed to drop, per flow. RPR can use Media Access Control protocol (MAC) messages to direct the traffic, which can use either ringlet of the ring. The nodes can also negotiate for bandwidth among themselves using fairness algorithms, avoiding congestion and failed spans. The avoidance of failed spans can be accomplished by using one of two techniques known as steering and wrapping. Under steering, if a node or span is broken, all nodes can be notified of a topology change, and they reroute their traffic. In wrapping, the traffic can be looped back at the last node prior to the break and routed to the destination station. RPR can guarantee bandwidth and switching. In RPR, the packets can be modified from the data plan.

Multiprotocol Label Switching (MPLS) is a mechanism in high-performance telecommunications networks that directs data from one network node to the next based on short path labels rather than long network addresses, avoiding complex lookups in a routing table. The labels can identify paths between distant nodes rather than endpoints. MPLS can encapsulate packets of various network protocols. MPLS can operate at a layer that is generally considered to lie between traditional definitions of data link layer (Layer 2) and network layer (Layer 3). MPLS can provide a unified data-carrying service for both circuit-based clients and packet-switching clients which provide a datagram service model. In all cases, the flow from the client may be considered to be altered in some way.

An MPLS Label Switch Router (LSR) interacts with the packet stream, and the client can be aware of the intermediate LSR equipment. Interoperation testing can be required to validate the complete solution.

SUMMARY

Some embodiments may include implementing a Media Access Control (MAC) Ethernet switch in a network. Some embodiments may include receiving, from a first Multiprotocol Label Switching (MPLS) router, at least, one data packet with a router MAC address identifying a second MPLS router. Some embodiments may provide for automatically learning the router MAC address identifying the second MPLS router. Embodiments may also include accessing information to determine the Internet Protocol (IP) address of the second MPLS router based on the learned router MAC address. Likewise, some embodiments may include transmitting the, at least, one data packet to the second MPLS router.

In some embodiments, the router MAC address of the first MPLS router may be learned from the at least one data packet. The IP address of the first MPLS router can also be automatically learned from the at least one data packet. Some embodiments may include storing the first router MAC address and the IP address in a forwarding database. Some embodiments may include automatically attempting to configure transport capacity to the requested address the interface is attempting to connect to with a default amount of capacity. Likewise, some embodiments may include monitoring a data plane in the network for other messages to determine appropriate desired capacity. Some embodiments may include analyzing the at least one data packet to determine a request for additional capacity. These embodiments may also include reporting the analyzed request for additional capacity. These embodiments may additionally include automatically reconfiguring the network based on the reported request for additional capacity.

In some embodiments, the Ethernet switch can be distributed. Some embodiments may include adding jitter to the at least one data packet. In some embodiments, a separate packet switch operation can be implemented on at least one of the at least one data packet as a quality control measure.

Some embodiments may include generating a forwarding database for a MAC Ethernet switch in a network. Some embodiments may include receiving, from an MPLS router, at least one data packet with a router MAC address identifying the MPLS router. Some embodiments may include automatically learning the router MAC address of the MPLS router from the at least one data packet. Some embodiments may also include automatically learning the IP address of the MPLS router from the at least one data packet. In some embodiments, the router MAC address and the IP address may be stored in a forwarding database.

Some embodiments may include implementing a MAC Ethernet switch in a network. Some embodiments may include receiving, from a first MPLS router, at least one data packet with a first router MAC address identifying the first MPLS router. Some embodiments may include automatically learning the first router MAC address of the first MPLS router from the at least one data packet. Some embodiments may include automatically learning the IP address of the first MPLS router from the at least one data packet. Some embodiments may also include storing the first router MAC address and the IP address in a forwarding database. Some embodiments may include receiving, from a second MPLS router, at least one data packet with the first router MAC address identifying the first MPLS router. Some embodiments may include automatically learning the first router MAC address identifying the first MPLS router. Some embodiments may include accessing information from the forwarding database to determine the IP address of the first MPLS router based on the learned router MAC address. Some embodiments may include transmitting the at least one data packet from the second MPLS router to the first MPLS router.

Some advantages of the embodiments described may include using the addresses when routers perform address resolution protocols so that data plane packets are not modified. Lack of modification may lead to lower hardware costs. Some embodiments may also remove or diminish the need for MPLS Label Switch Routers (LSR). Some embodiments may allow for auto configuration of external Transport Network Addresses (TNA) based on the binding of router MAC addresses and IP addresses by the Address Resolution Protocol (ARP) protocol or other means such as, for example, the use of OSPF or IS_IS Hello packets.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 4 illustrates an exemplary forwarding database table for implementing a MAC Ethernet switch in a network.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Data communication networks may include various computers, servers, nodes, routers, switches, bridges, hubs, proxies, and other network devices coupled to and configured to pass data to one another. These devices are referred to herein as "network elements" or "network devices." Data is communicated through the data communication network by passing protocol data units, such as Internet Protocol (IP) packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

Figure 1:
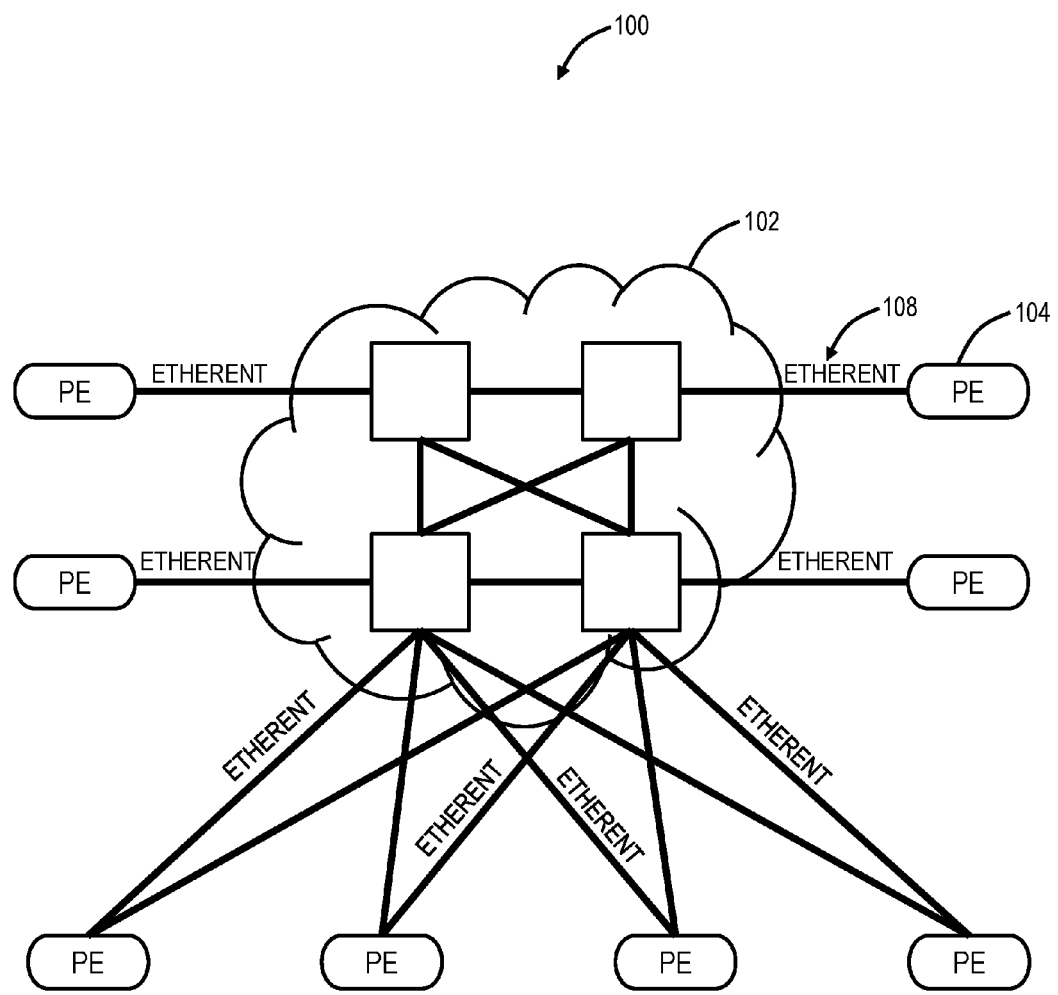
FIG. 1 illustrates exemplary PacketWave network architecture.

FIG. 1 illustrates exemplary PacketWave network architecture 100. PacketWave describes an architecture to realize an IP/MPLS network, in which the Edge Routers (PEs) are implemented "as is", but their mutual connectivity across the network core may be provided using an underlay comprising distributed Layer 2 switches collectively offering an Ethernet LAN services to all attached PEs. In FIG. 1, the clients (PE) can attach to a packet optical network element with Ethernet Interfaces 108. The packet wave can aggregate packets onto an optical interface 110 in the network 102. Next, the packet wave can adjust network capacity and topology (e.g., wavelengths) to match service demands. Under failure scenarios, the packet wave can maintain a desired network topology. The packet wave can provide hitless network defragmentation. This can allow for capacity and topology maintenance/re-optimization.

In some embodiments, the flows can be on optical interfaces 110 and capacity can be adjusted between any edge devices, e.g., the clients 104. With different interfaces, aggregation may be desired, such as linked aggregation groups. Capacity can be determined through monitoring traffic between routers 106. Likewise, the network 102 can react to faults so that the losses are in milliseconds. Packet flows between the routers 106 can be adjusted on a per-adjacency basis (e.g., 15 Gbps). The adjustments can be policed. In another example, the adjustments can be shaped within this flow with a point-to-point flow. The flow can be an MPLS pseudo wire (PW); a label switched path (LSP), or other packet tagging mechanism (e.g., MAC in MAC, also known as MiM).

Carrier Ethernet control technology can be used, specifically Provider Backbone Bridge Traffic Engineering (PBB-TE). Other technologies can be implemented, including Shortest Path Bridging MAC (SPBM) and G.8032, but packet modification may not be required. The system can be implemented on both a distributed Ethernet switch connected with transport technology and a single device. Likewise, transport technology can be anything that provides Ethernet capacity. Some examples include Optical Transport Network (OTN), and Synchronous Optical Networking (SONET). While the data plane may be manipulated, no packet modification can be required to be performed, and control packets may not be found in the data plane. In some embodiments, a pseudowire (PW), a Label Switched Path (LSP), or the aggregated adjacency can be used. A Dense Wave Division Multiplexing (DWDM) can switch wavelengths.

Three examples of packet wave service delivery models are transport networks, dynamic networks, and Software Defined Networking (SDN). With a transport network, there can be static connections. The transport network can use a subset of the dynamic case from a packet control software that uses a combination of hardware and software to manage and forward packets. A dynamic network can be packet-centric. An interface between packet and optical domains can be used to dynamically set up the network and to reconfigure the network. An SDN can discover the network and can control flows within the network.

Figure 2:
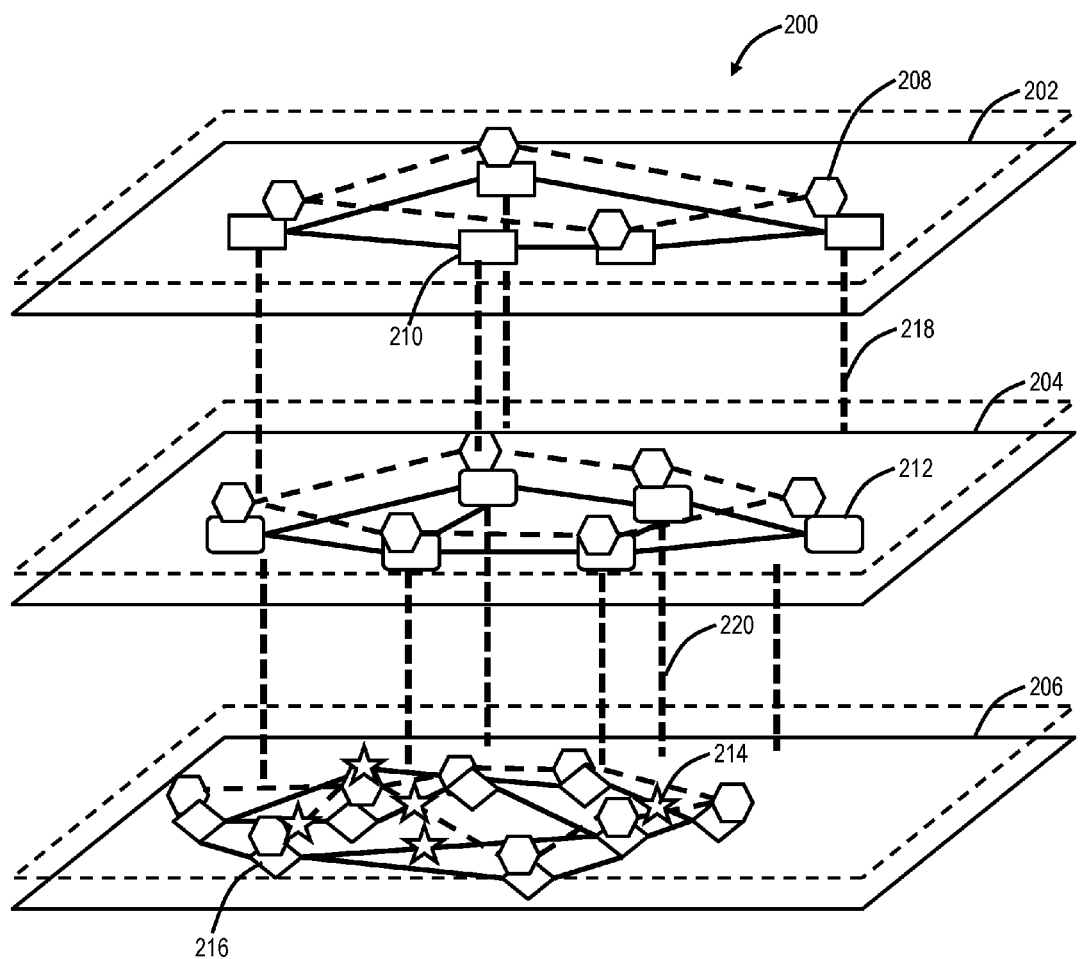
FIG. 2 illustrates an exemplary network layer.

FIG. 2 illustrates a packet wave control plane/network layer 200. As shown in FIG. 2, there is a client router layer 202, an Ethernet/transport layer 204, and photonic switching layer 206. The client router layer 202 includes in-skin control plane instances 208 (shown as hexagons on FIG. 2) and routers 210 (shown as rectangles). The Ethernet/transport layer 204 includes in-skin control plane instances 208 and transport switching elements 212 (shown as rounded rectangles). The photonic switching layer 206 includes optical amplifier sites 214 (shown as stars), in-skin control plane instances 208, and wavelength switching elements 216 (shown as diamonds). Data packets between the client router layer 202 and the Ethernet/transport layer 204 can use Ethernet 218 for transport. Wavelengths 220 can be used to transfer data packets between the Ethernet/transport layer 204 to the photonic switching layer 206.

In some embodiments, the control plane can be used as a transport layer to implement a MAC Ethernet switch, similar to Ethernet on SONET. The router MAC and router IP address can be flooded in the transport layer topology. The router MAC and router IP addresses can be flooded in the transport layer control plane as transport network addresses (TNA). The transport control plane can have optimization (e.g., with regard to administration weight, latency), protection attributes (e.g., dedicated protection scheme for 50 ms, control plane redial) or reversion applied. Flooding can be used by a control plane to disseminate learned end-point addressing so that service-based addressing can be resolved by the transport layer. In some embodiments, the transport/DWDM can use the learned TNA and the value that drives the TNA. For example, service addressing can be distributed in the lower layer control planes and allow the devices to use service addressing (e.g., IP/MAC) instead of typical transport addressing.

The client layer in FIG. 2 can be a service layer. The client layer can address traffic demands and service processing. The Ethernet/transport layer can provide protection to the network. For example, the Ethernet/transport layer can have Shared Link Risk Group (SLRG) awareness. The Ethernet/transport layer can provide quality control measures. For example, the Ethernet/transport layer can also provide monitored paths and capacity protection sharing. There can be a switching and transponder mix and photonic protection triggers.

The photonic switching layer can provide restoration for full and partial failure events. This layer can provide fiber topology awareness, including path computation, and link budget computation, wavelength assignment. The photonic switching layer can also have SRLG awareness. Both the Ethernet/transport layer and the photonic switching layer can be used as planning tools to determine capacity, provide logical address assignments, and conduct failure simulations.

Figure 3:
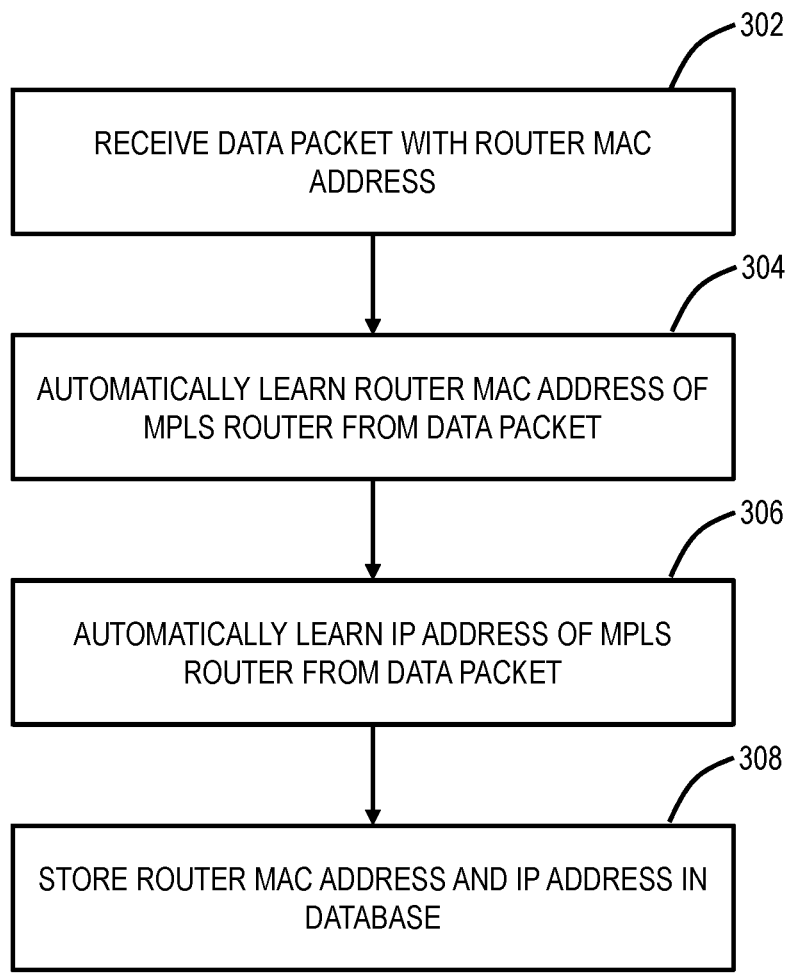
FIG. 3 illustrates an exemplary flow for implementing a router Media Access Control (MAC) Ethernet switch in a network.

FIG. 3 illustrates an exemplary flow for implementing a MAC Ethernet switch in a network. At least one data packet can be received from an MPLS router, the data packet including a router MAC address identifying the MPLS router (302). The router MAC address of the MPLS router can be automatically learned from the at least one data packet (304). An IP address of the MPLS router can be automatically learned from the data packet (306). The router MAC address and the IP address can be stored in a database (308).

FIG. 4 illustrates an exemplary forwarding database table for implementing a MAC Ethernet switch in a network. In FIG. 4, the MPLS routers are designated with their router IP loopback address. Each MPLS router in FIG. 4 has a router interface MAC address associated with it, along with a Network Service Access Point (NSAP) address and an Interface Number. For example, in FIG. 4, MPLS router 10.1.1.1 is associated with router interface MAC address 00:08:5C:00:00:01, NSAP address 49.0001.1111.1111.1111.00, and Interface Number NSAP Interface Number 1. Likewise, MPLS router 10.1.1.2 is shown in FIG. 4 as being associated with router interface MAC address 00:0F:EA:91:04:07, NSAP address 49.0001.1234.AAAA.AAAA.AAAA.00, and Interface Number NSAP Interface Number 2. MPLS router 10.1.1.3 is associated with router interface MAC address BC:AE:C5:C3:16:93, NSAP address 49.0001.AAAA.BBBB.CCCC.00, and Interface Number NSAP Interface Number 3. MPLS router 10.1.1.4 associated with router interface MAC address BC:A2:33:91:00:16, NSAP address 49.0001.ABCD.ABCD.ABCD.00, and Interface Number NSAP Interface Number 4.

In some embodiments, each MPLS router may be associated with an IPv4 and/or IPv6 address. The IP addresses and NSAP addresses can provide addressing whereas the Ethernet can be used to flow the data packets. In some embodiments, table 400 information can be used with an out-of-band control plane to provide desired connectivity. For example, the media of that layer can be used (e.g. packet underlay technology using private addressing space, such as MPLS-TP or PBB). In another example, different media can be used (e.g., OTN, SONET, or DWDM). In some embodiments, if underlay is used in a stable environment, it can eliminate the use of data plane multicast, and with that, it can eliminate the possibility of looping of multicast packets.

In some embodiments, link aggregation (LAG) can affect implementing a MAC Ethernet switch. Multiple matches per router and router MAC (not shown) may be required. For example, an interface number can have NSAP unique interface numbers for each of the routers.

Figure 5:
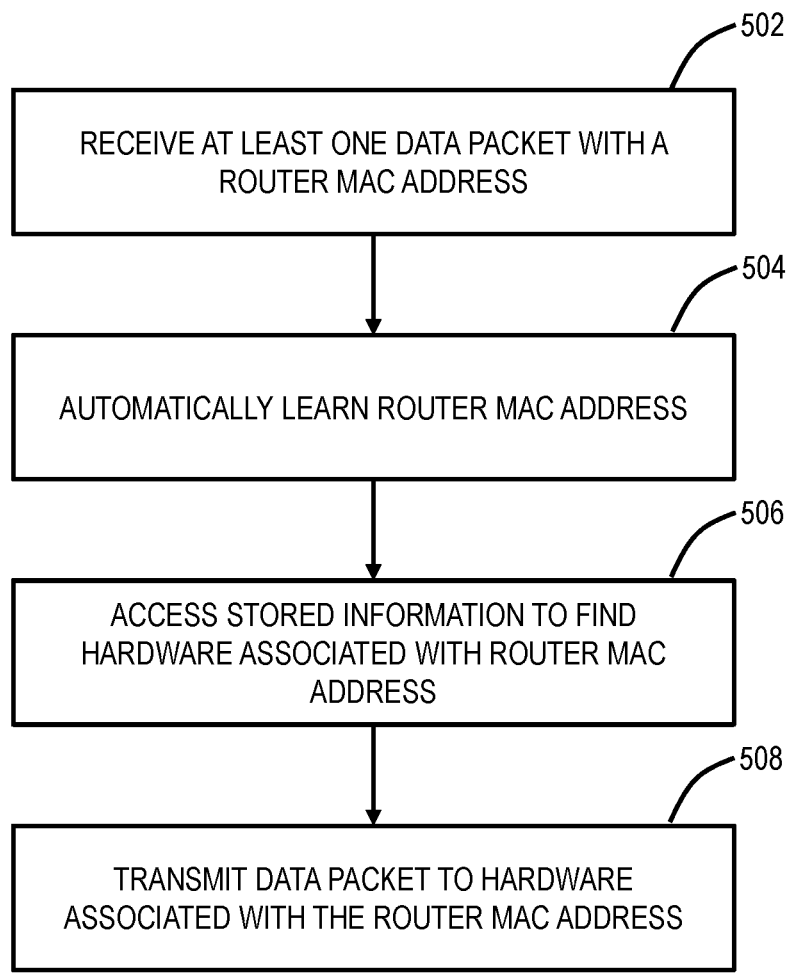
FIG. 5 illustrates a second exemplary flow for implementing a MAC Ethernet switch in a network.

FIG. 5 illustrates a second exemplary flow for implementing a MAC Ethernet switch in a network. At least one data packet can be received from a first MPLS router (302). The at least one data packet can include a router MAC address identifying a second MPLS router. The router MAC address of the second MPLS router can be automatically learned from the at least one data packet (304). Information can be accessed to determine the IP address based on the learned router MAC address (506). The at least one data packet can be transmitted to the second MPLS router based on the learned router MAC address (508).

In some embodiments, a forwarding database can be provided by a user. For instance, a table can be uploaded to a system so that the system need not learn which router MAC addresses are linked to certain IP addresses.

Figure 6:
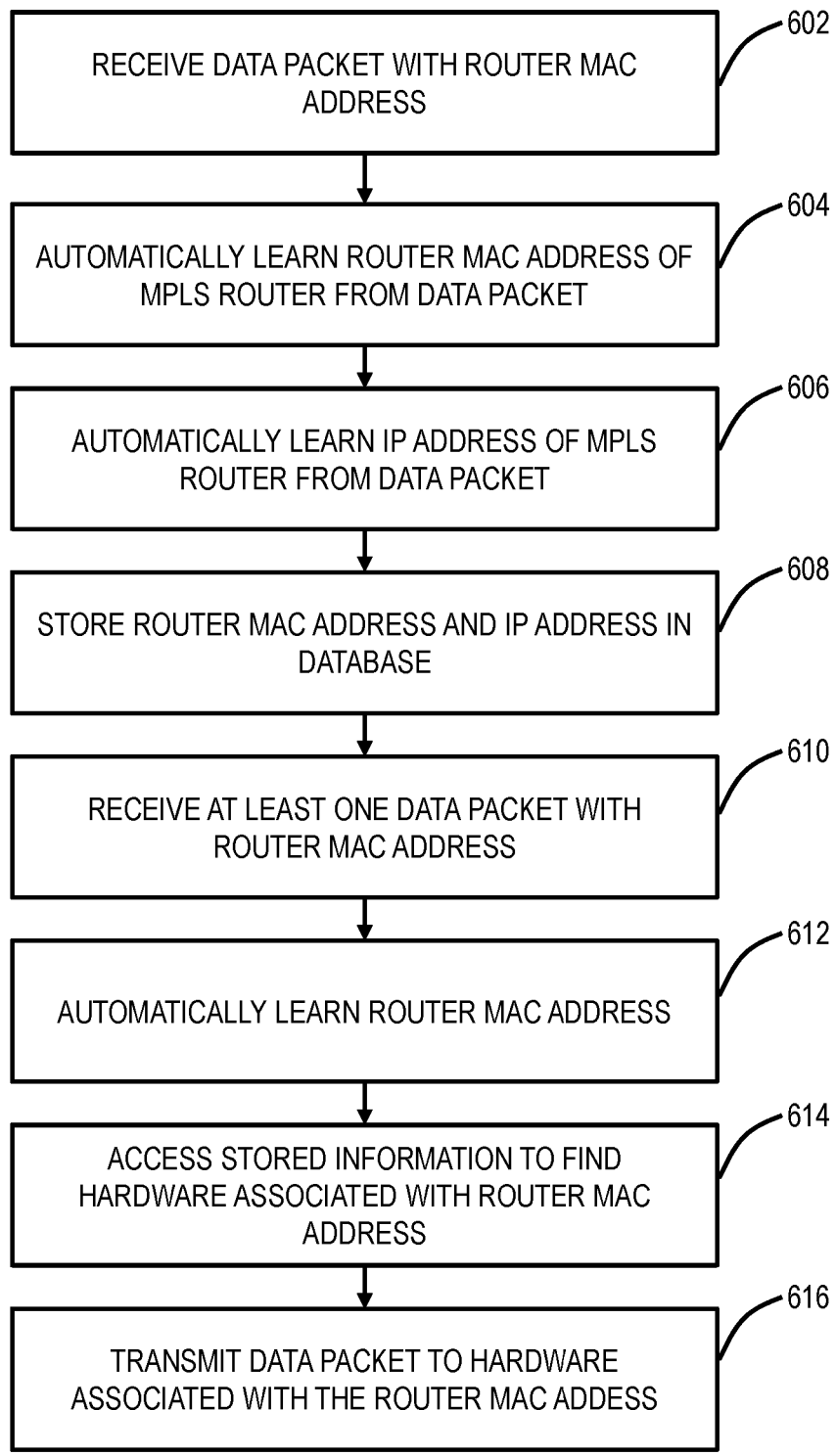
FIG. 6 illustrates a third exemplary flow for implementing a MAC Ethernet switch in a network.

FIG. 6 illustrates an exemplary flow for generating a MAC Ethernet switch in a network. At least one data packet can be received from a first MPLS router, the data packet including a router MAC address identifying the first MPLS router (602). The router MAC address of the first MPLS router can be automatically learned from the at least one data packet (604). An IP address of the MPLS router can be automatically learned from the data packet (606). The router MAC address and the IP address can be stored in a database (608).

At least one data packet can be received from a second MPLS router (610). The at least one data packet from the second MPLS router can include a router MAC address identifying the first MPLS router. The network location of the router interfaces MAC address of the first MPLS router can be automatically learned from their appearance as source addresses in a frame and used for forwarding when a previously learned address is seen as a destination. Information can be accessed to determine the IP address based on the learned router interface MAC address (614). The at least one data packet can be transmitted to the first MPLS router based on the learned router interface MAC address from the first MPLS router (616).

In an exemplary embodiment, a method implemented by a Media Access Control (MAC) Ethernet switch in a network receiving, from a first Multiprotocol Label Switching (MPLS) router, a packet with a first IP address and a first MAC address identifying the first MPLS router as a source of the packet, and a second IP address and a second MAC address identifying a destination; upon resolving a destination MAC address, forwarding the packet directly to a second MPLS router by a data path determined by the MAC address of the second router; upon failing to resolve the destination MAC address, forwarding the packet to a plurality of Ethernet switches in the network using an out-of-band control associated with the Ethernet network, wherein each of the plurality of Ethernet switches transmits the packet to connectively coupled MPLS routers; receiving, from a second MPLS router connectively coupled to a second Ethernet switch, a second packet containing a second IP address and a previously unresolved MAC address identifying the second MPLS router as a source of the second packet; and forwarding, by the second Ethernet switch, the second packet to the plurality of Ethernet switches using the out-of-band control, wherein each of the plurality of Ethernet switches transmits the packet to connectively coupled MPLS routers.

The method can further include automatically attempting to configure transport capacity to the requested address the interface is attempting to connect to with a default amount of capacity. The method can further include monitoring a data plane in the network for other messages to determine appropriate desired capacity. The method can further include analyzing the at least one data packet to determine a request for additional capacity. The method can further include reporting the analyzed request for additional capacity. The method can further include automatically reconfiguring the network based on the reported request for additional capacity. The Ethernet switch can be distributed. A separate packet switch operation can be implemented on at least one of the at least one data packet as a quality control measure.

A system for implementing a Media Access Control (MAC) Ethernet switch in a network includes switch configured to receive, from a first Multiprotocol Label Switching (MPLS) router, a packet with a first IP address and a first MAC address identifying the first MPLS router as a source of the packet, and a second IP address and a second MAC address identifying a destination, forward the packet directly to a second MPLS router by a data path determined by a destination MAC address of the second router upon resolving the MAC address, forward the packet to a plurality of Ethernet switches in the network using an out-of-band control associated with the Ethernet network upon failing to resolve the destination MAC address, wherein each of the plurality of Ethernet switches transmit the packet to connectively coupled MPLS routers, and receive, from a second MPLS router connectively coupled to a second Ethernet switch, a second packet containing a second IP address and a previously unresolved MAC address identifying the second MPLS router as a source of the second packet, wherein the second Ethernet switch is configured to forward the second packet to the plurality of Ethernet switches using the out-of-band control, wherein each of the plurality of Ethernet switches transmit the packet to connectively coupled MPLS routers.

The switch can be configured to automatically attempt to configure transport capacity to the requested address the interface is attempting to connect to with a default amount of capacity. The switch can be configured to monitor a data plane in the network for other messages to determine appropriate desired capacity. The switch can be configured to analyze the at least one data packet to determine a request for additional capacity. The switch can be configured to report the analyzed request for additional capacity. The switch can be configured to automatically reconfigure the network based on the reported request for additional capacity. The switch can be distributed. A separate packet switch operation can be implemented on at least one of the at least one data packet as a quality control measure.

In a further exemplary embodiment, a non-transitory computer-readable medium with stored instructions for implementing a Media Access Control (MAC) Ethernet switch in a network wherein execution of the program logic is executed by one or more processors of a computer system. The medium includes logic configured to receive, from a first Multiprotocol Label Switching (MPLS) router, a packet with a first IP address and a first MAC address identifying the first MPLS router as a source of the packet, and a second IP address and a second MAC address identifying a destination; logic configured to resolve the at least one destination MAC address; and logic configured to forward the packet directly to a second MPLS router by a data path determined by the MAC address of the second router upon resolving a destination MAC address; logic configured to forward the packet to a plurality of Ethernet switches in the network using an out-of-band control associated with the Ethernet network upon failing to resolve the destination MAC address, wherein each of the plurality of Ethernet switches transmit the packet to connectively coupled MPLS routers; logic configured to receive, from a second MPLS router connectively coupled to a second Ethernet switch, a second packet containing a second IP address and a previously unresolved MAC address identifying the second MPLS router as a source of the second packet; and logic configured to forward, by the second Ethernet switch, the second packet to the plurality of Ethernet switches using the out-of-band control, wherein each of the plurality of Ethernet switches transmits the packet to connectively coupled MPLS routers.

Generally, unless stated otherwise explicitly, the phrase "logic configured to" as used throughout this disclosure is intended to invoke an aspect that is at least partially implemented in hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates the transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An Ethernet-over-Dense Wave Division Multiplexing (DWDM) packet switch system, comprising:
 a transport switching element configured to switch Optical Transport Network (OTN) traffic communicatively coupled to one or more routers in a client layer and communicatively coupled via a photonic switching layer with a plurality of transport switching elements forming a transport layer of OTN;
 wherein the transport switching element is a network element comprising a processor and memory storing instructions configured to
 operate a control plane with the plurality of transport switching elements in the transport layer, and
 flood addresses by the control plane to control the transport switching element in the transport layer, wherein the addresses are associated with the one or more routers and are flooded to disseminate learned endpoint addresses of the one or more routers so that service-based addressing comprising one or more of Ethernet Media Access Control (MAC) addresses and Internet Protocol (IP) addresses is resolved by the transport layer of OTN through the control plane, wherein the flooded addresses are from the client layer and flooded by the control plane in the transport layer.

2. The system of claim 1, wherein the addresses from the client layer are flooded in the control plane which is a lower layer control plane relative to the client layer to allow the transport switching element and the plurality of transport switching elements to use of the addresses.

3. The system of claim 1, wherein the addresses comprise one or more of a Media Access Control (MAC) address and an Internet Protocol (IP) address.

4. The system of claim 1, wherein the transport layer is configured to implement a Media Access Control (MAC) Ethernet switch in the transport layer between the one or more routers.

5. The system of claim 1, wherein the client layer addresses traffic demands and service provisioning, the transport layer provides protection to the client layer, and the photonic switching layer provides path computation, and link budget computation, wavelength assignment.

6. The system of claim 1, wherein the transport switching element is configured to
receive a data packet from the one or more routers,
automatically learn an address from the data packet, and
store the learned address in a database and flood the learned address via the control plane.

7. The system of claim 1, wherein the transport switching element is configured to
receive a data packet from the one or more routers,
automatically learn an address from the data packet,
access a database containing the flooded addresses to determine a corresponding transport switching element associated with the learned address, and
transmit the data packet to the corresponding transport switching element via the transport layer.

8. An Ethernet-over-Dense Wave Division Multiplexing (DWDM) network, comprising:
a plurality of routers communicatively coupled to a plurality of transport switching elements each comprising a network element configured to switch Optical Transport Network (OTN) traffic which are communicatively coupled to one another via wavelengths in a photonic switching layer;
wherein the plurality of transport switching elements each comprise a processor and memory storing instructions configured to operate a control plane, wherein the control plane operates between the plurality of transport switching elements for control thereof, and
wherein the control plane is configured to implement an Ethernet Media Access Control (MAC) switch over a transport layer of OTN associated with the plurality of transport switching elements by
flooding addresses associated with the one or more routers in the transport layer to disseminate learned end-point addresses of the one or more routers so that service-based addressing comprising one or more of Ethernet MAC addresses and Internet Protocol (IP) addresses is resolved by the transport layer of OTN,
wherein the flooded addresses are from a client layer and flooded by the control plane in the transport layer.

9. The network of claim 8, wherein the addresses from the client layer associated with the plurality of routers are flooded in the control plane which is a lower layer control plane relative to the client layer to allow the plurality of transport switching elements use of the addresses.

10. The network of claim 8, wherein the addresses comprise one or more of a Media Access Control (MAC) address and an Internet Protocol (IP) address.

11. The network of claim 8, wherein the transport layer is configured to implement a Media Access Control (MAC) Ethernet switch in the transport layer between the plurality of routers.

12. The network of claim 8, wherein the client layer addresses traffic demands and service provisioning, the transport layer provides protection to the client layer, and the photonic switching layer provides path computation, and link budget computation, wavelength assignment.

13. The network of claim 8, wherein each of the plurality of transport switching elements are configured to
receive a data packet from the plurality of routers,
automatically learn an address from the data packet, and
store the learned address in a database and flood the learned address via the control plane.

14. The network of claim 8, wherein each of the plurality of transport switching elements are configured to
receive a data packet from the plurality of routers,
automatically learn an address from the data packet,
access a database containing the flooded addresses to determine a corresponding transport switching element associated with the learned address, and
transmit the data packet to the corresponding transport switching element via the transport layer.

15. An Ethernet-over-Dense Wave Division Multiplexing (DWDM) method, comprising:
communicating data from a plurality of routers to one another via a plurality of transport switching elements each comprising a network element configured to switch Optical Transport Network (OTN) traffic which are communicatively coupled to one another via wavelengths in a photonic switching layer;
operating a control plane between the plurality of transport switching elements for control thereof; and
implementing an Ethernet switch through the control plane by the plurality of transport switching elements over a transport layer of OTN by
flooding addresses, by the plurality of transport switching elements through the control plane which implements an Ethernet Media Access Control (MAC) switch, associated with the one or more routers in the transport layer to disseminate learned end-point addresses of the one or more routers so that service-based addressing comprising one or more of Ethernet MAC addresses and Internet Protocol (IP) addresses is resolved by the transport layer of OTN,
wherein the flooded addresses are from a client layer and flooded by the control plane in the transport layer.

16. The method of claim 15, wherein the addresses from the client layer associated with the plurality of routers are flooded in the control plane which is a lower layer control plane relative to the client layer to allow the transport switching elements use of the addresses.

17. The method of claim 15, wherein the addresses comprise one or more of a Media Access Control (MAC) address and an Internet Protocol (IP) address.

18. The method of claim 15, wherein the transport layer is configured to implement a Media Access Control (MAC) Ethernet switch in the transport layer between the plurality of routers.

19. The method of claim 15, wherein the client layer addresses traffic demands and service provisioning, the transport layer provides protection to the client layer, and the photonic switching layer provides path computation, and link budget computation, wavelength assignment.

20. The method of claim 15, further comprising:
receiving a data packet from the plurality of routers;

automatically learning an address from the data packet; and performing one or more of storing the learned address in a database, flooding the learn address via the control plane, accessing a database containing the flooded addresses to determine a corresponding transport switching element associated with the learned address; and transmitting the data packet to the corresponding transport switching element via the transport layer.

* * * * *